Figure 1:
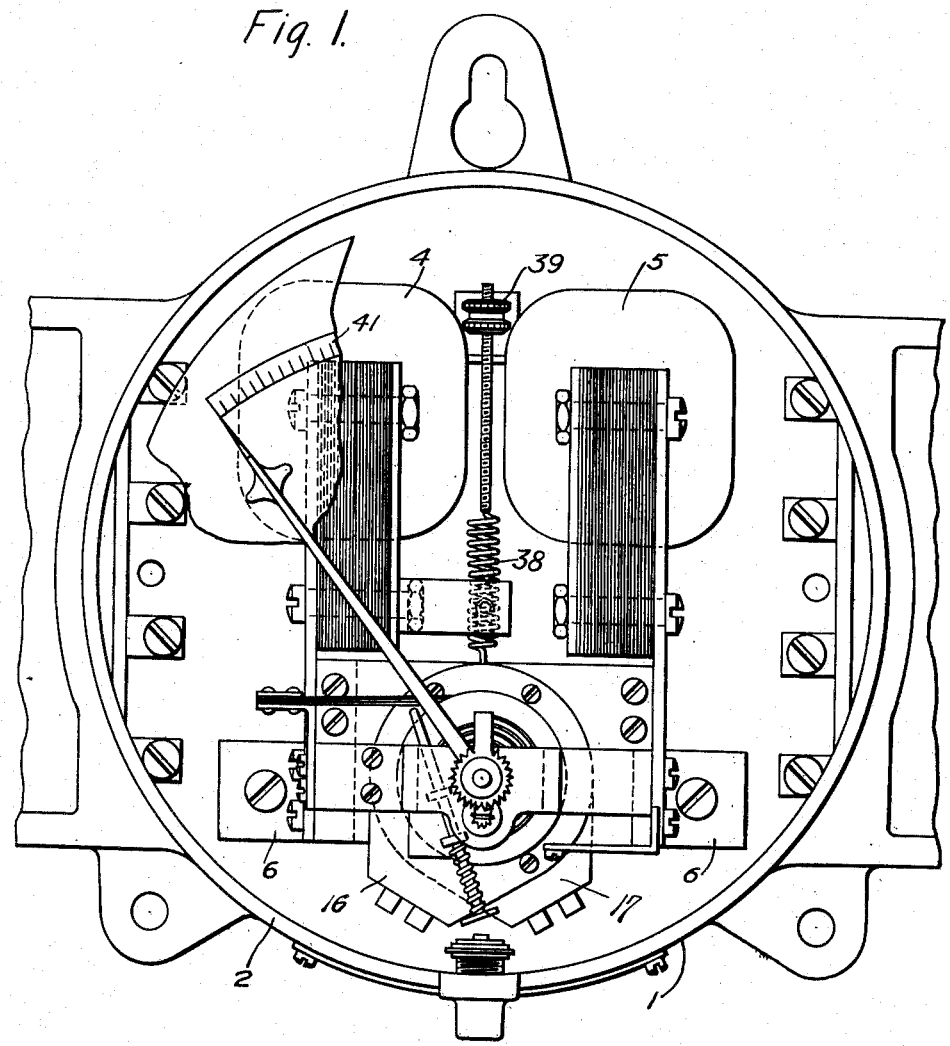

P. M. LINCOLN & B. H. SMITH.
MEASURING INSTRUMENT.
APPLICATION FILED APR. 5, 1917.

1,300,283.

Patented Apr. 15, 1919.
3 SHEETS—SHEET 1.

WITNESSES:
Ed Plinke.

INVENTOR
Paul M. Lincoln &
Benjamin H. Smith.
BY
ATTORNEY

P. M. LINCOLN & B. H. SMITH.
MEASURING INSTRUMENT.
APPLICATION FILED APR. 5, 1917.

1,300,283.

Patented Apr. 15, 1919.
3 SHEETS—SHEET 2.

WITNESSES:
Ed Plinke.
JA Procter

INVENTOR
Paul M. Lincoln &
Benjamin H. Smith.
BY
Wesley G. Carr
ATTORNEY

UNITED STATES PATENT OFFICE.

PAUL M. LINCOLN, OF PITTSBURGH, AND BENJAMIN H. SMITH, OF TURTLE CREEK, PENNSYLVANIA; SAID SMITH ASSIGNOR TO WESTINGHOUSE ELECTRIC AND MANUFACTURING COMPANY, A CORPORATION OF PENNSYLVANIA.

MEASURING INSTRUMENT.

1,300,283.      Specification of Letters Patent.      Patented Apr. 15, 1919.

Application filed April 5, 1917. Serial No. 159,925.

*To all whom it may concern:*

Be it known that we, PAUL M. LINCOLN, a citizen of the United States, and a resident of Pittsburgh, in the county of Allegheny and State of Pennsylvania, and BENJAMIN H. SMITH, a citizen of the United States, and a resident of Turtle Creek, in the county of Allegheny and State of Pennsylvania, have invented a new and useful Improvement in Measuring Instruments, of which the following is a specification.

Our invention relates to electrical measuring instruments and particularly to maximum-demand meters.

One object of our invention is to provide a meter of the above indicated character that shall be adapted to slowly respond to the energy to be measured.

Another object of our invention is to provide a slowly-responsive wattmeter of the thermal type that shall have means for equalizing the radiation and dissipation of heat from its thermal elements.

A further object of our invention is to provide a maximum-demand meter of the above indicated character that shall be simple to construct and accurate and reliable in its operation.

U. S. Patent No. 1,156,412, issued October 12, 1915, to Paul M. Lincoln discloses a slowly responsive wattmeter having a maximum-demand attachment. This device so utilizes the heating effects of the current and the voltage of the circuit that the pointer is responsive to the differential effects of the current and the voltage at predetermined intervals of time, and, consequently, to the power traversing the circuit.

In our present invention, we have utilized the broad principles of the above indicated invention but have simplified the device and provided means for equalizing the heat dissipation from its thermal-responsive members. That is, we provide a rotatable shaft having an indicator at one end, two spiral bimetallic springs surrounding the shaft intermediate its ends and adapted to exert opposing actions thereon, windings symmetrically disposed between, and at each side of, the springs for heating the same in accordance with the sum and the difference of the current and potential of the circuit to be measured, and means disposed on the other end of the shaft for equalizing the radiation and dissipation of heat from the springs.

Figure 2:
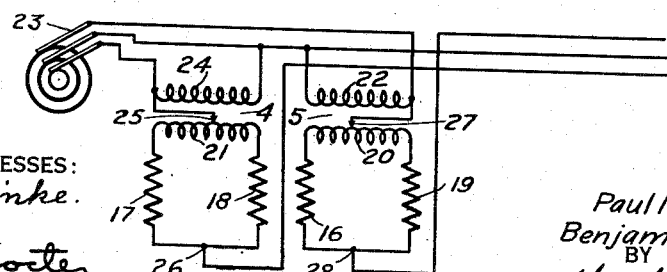
Figure 3:
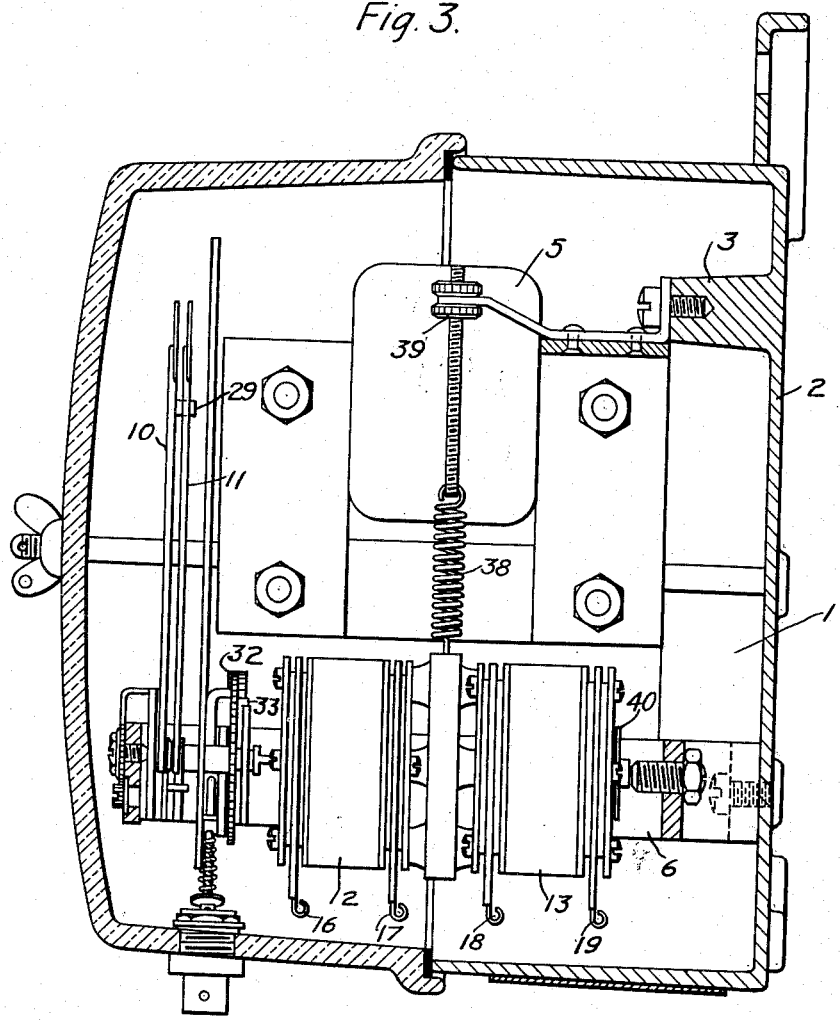
Figure 4:
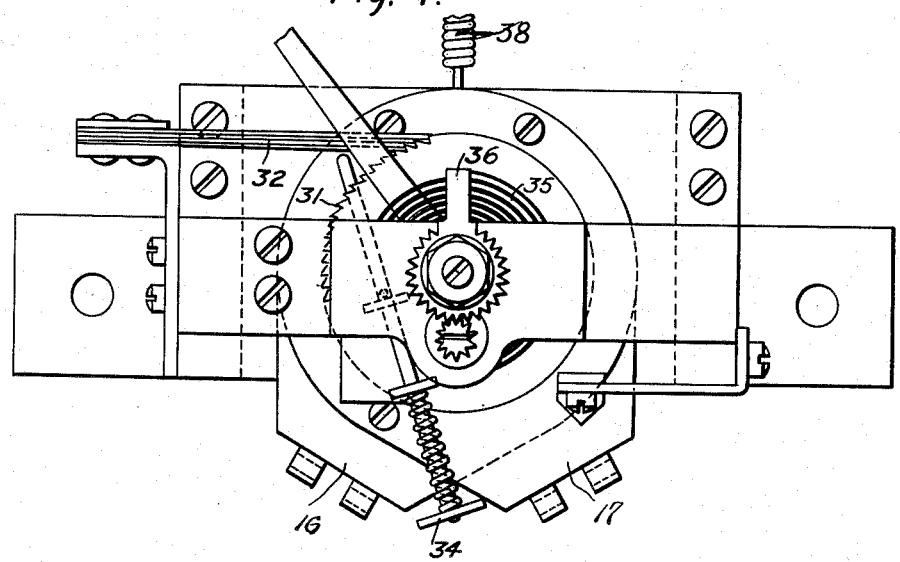
Figure 5:
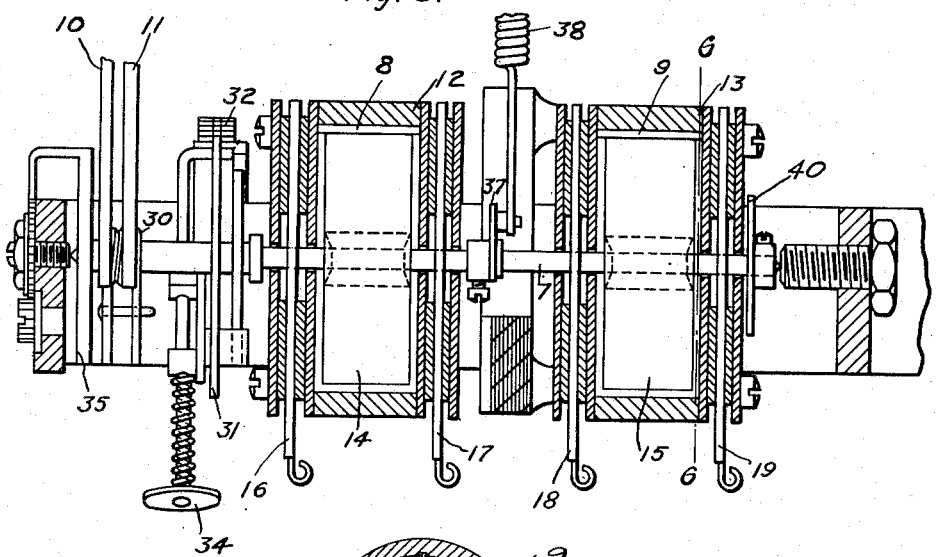
Figure 6:
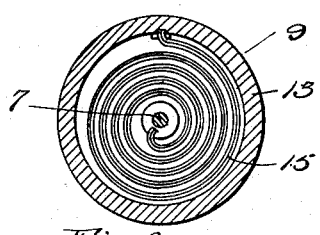

In the accompanying drawings, Figure 1 is a front view, with parts broken away, of a maximum-demand meter embodying our invention; Fig. 2 is a diagram illustrating the connections of the instrument shown in Fig. 1; Fig. 3 is a side view, partially in elevation and partially in section, of the instrument shown in Fig. 1; Fig. 4 is a front elevational view of the thermal-responsive elements of the meter shown in Figs. 1, 3, and Fig. 5 is a side view, partially in section and partially in elevation, of the thermal-responsive elements shown in Fig. 4, and Fig. 6 is a view taken along the line VI—VI in Fig. 5.

The instrument 1 comprises, in general, an inclosing casing 2 having lugs 3 in the base thereof upon which are mounted two transformers 4 and 5 and a member 6 that is adapted to support a rotatable shaft 7 with which are associated two thermal-responsive elements 8 and 9, an indicator or pointer 10 and a maximum-demand pointer or indicator 11.

The thermal-responsive devices 8 and 9 comprise cylindrical metallic casings 12 and 13, in which are disposed bimetallic spiral springs 14 and 15 and at the sides of which are supported heating windings 16, 17, 18 and 19. The windings 16, 17, 18 and 19 are adapted to so evenly heat the springs 14 and 15 that the dissipation and radiation of heat caused by the windings is equalized.

The heating windings 16 and 19 are connected in series relation to the winding 20 of the transformer 5, and the windings 17 and 18 are connected in series relation to the winding 21 of the transformer 4. The winding 22 of the transformer 5 is connected in shunt relation to the conductors of one phase of the circuit 23, the power traversing which is to be measured, and the winding 24 of the transformer 4 is connected in shunt relation to the conductors of the other phase of the circuit 23. The parallel-connected circuit between the mid-point 25 of the winding 21 and the mid-point 26 between the windings 17 and 18 is connected in series relation with one conductor of the circuit 23. Similarly, the circuit between the mid-point 27 of the winding 20 and the mid-point 28 between the windings 16 and 19 is connected in series relation to another conductor of the circuit 23.

With the above-mentioned connections, the windings 16 and 19 are supplied with current in accordance with the sum and the difference of the current and voltage traversing one phase of the circuit 23, and the windings 17 and 18 are supplied with current in accordance with the sum and the difference of the current and voltage traversing another phase of the circuit 23. Since the windings 16 and 17 are associated with the spring 14, the latter will be heated in accordance with the square of the sum of the currents and voltages of both phases of the circuit 23, and, since the spring 15 is associated with the windings 18 and 19, it will be heated in accordance with the square of the difference of the currents and voltages of both phases of the circuit 23. Consequently, if the springs 14 and 15 are opposed in their action, the resultant of their thermal-responsive effects will be proportional to the power traversing the circuit 23.

The inner ends of the springs 14 and 15 are operatively connected to the shaft 7 and their outer ends are connected to the cylindrical members 12 and 13. However, they are so oppositely disposed with respect to each other that they exert opposing actions upon the shaft 7. The pointer 10 is mounted directly upon the shaft 7 and is provided with a lug or projection 29 that is adapted to engage the pointer 11 for the purpose of moving the same in one direction in accordance with the movement of the pointer 10. The pointer 11 is mounted on a sleeve 30 that loosely surrounds the shaft 7 and upon which is also mounted a ratchet wheel 31. The ratchet wheel 31 is adapted to be engaged by a pawl 32, and a spring 33 is provided for returning the pointer 11 to its initial position when the pawl 32 is disengaged from the ratchet wheel 31. A spring-restrained member 34 is provided for moving the pawl 32 out of engagement with the ratchet wheel 31 when it is desired to permit the pointer 11 to be reset.

The shaft 7 is provided with a control spring 35 one end of which is connected to an adjustable member 36 and the other end of which is connected to the shaft 7. Thus, the pointer 10 may return to its initial position when no current traverses the windings 16, 17, 18 and 19. A crank or lever arm 37 is secured to the shaft 7 at a point between the elements 8 and 9 and is operatively connected to one end of a spring 38 the other end of which is connected, through an adjusting device 39, to the lug 3. The spring 38 is utilized for the purpose of adjusting the full-load indication of the instrument to cause the instrument to be accurately responsive for all values of power.

A conducting member 40 is mounted on the shaft 7 at the end opposite to that upon which are mounted the pointers 10 and 11 and has such conducting properties that it permits the same dissipation and radiation of heat from the member 9 that the elements 10, 11, 30, 31 and 32 permit from the element 8. That is, it equalizes the dissipation of heat from the two thermal elements of the instrument and thereby causes the differential action of the two elements 8 and 9 to be proportional to the power traversing the circuit 23.

Since the springs 14 and 15 are heated in accordance with the square of the sum of the voltage and current traversing the circuit 23 and the square of the difference of the voltage and currents traversing the circuit 23 and, since the differential action of the springs 14 and 15 is transmitted to the shaft 7, it will be readily understood that the pointer 10 will be actuated in accordance with the differential of these two values and, consequently, in accordance with the power traversing the circuit 23. However, the thermal elements 8 and 9 are so insulated and the resistances of the windings 16, 17, 18 and 19 are of such values that the pointer 10 requires a definite time to reach the maximum value of the power to be measured. This time varies in accordance with the logarithmic law and, consequently, the indication of the pointer 11 upon the scale 41 is an indication of the maximum demand. Since the pointer 10 is mounted on the shaft 7 and since the spring 35 is adapted to oppose the movement of the shaft 7, it will be understood that the pointer 10 will be slowly responsive to changes in the power traversing the circuit 23. However, the pointer 11 will remain in its maximum position until manually reset by means of the member 34.

We do not limit our invention to the particular structure illustrated, as it may be variously modified without departing from the spirit and scope of the invention as set forth in the appended claims.

We claim as our invention:

1. An electrical measuring instrument comprising a shaft, an indicating member mounted thereon, two thermal-responsive spring members surrounding the shaft to exert opposing actions thereon and means for heating one of the spring members in accordance with the sum, and the other in accordance with the difference, of the voltage and current of the circuit to be measured.

2. A wattmeter for an electric circuit comprising a rotatable member, two thermostatic spring members surrounding the rotatable member and adapted to exert opposing actions thereon, and means for heating one of the spring members in accordance with the sum, and the other in accordance with the difference, of the voltage and current traversing the circuit to be measured.

3. A measuring instrument for an electric circuit comprising an indicating element, two bimetallic spiral spring members adapted to exert opposing actions on the said element, and means for heating one of the spring members in accordance with the sum, and the other in accordance with the difference, of the voltage and current traversing the circuit to be measured.

4. A measuring instrument for an electric circuit comprising a rotatable shaft, a pointer mounted on one end thereof, a spring for controlling the resetting of the pointer, two thermostatic spring members surrounding the shaft and adapted to exert opposing actions thereon, means for heating the spring members in accordance with the sum and the difference, respectively, of the current and voltage traversing the circuit, and means mounted adjacent to the other end of the shaft to compensate for the heat dissipation caused by the pointer and the control spring on the other end of the shaft.

5. A measuring instrument for an electric circuit comprising a rotatable shaft, a pointer mounted at one end thereof, thermal-responsive means surrounding the shaft intermediate its ends and adapted to exert opposing actions thereon, and means associated with the other end of the shaft to compensate for the unequal heat dissipation caused by the heat conduction of the pointer.

6. A measuring instrument for an electric circuit comprising a rotatable shaft, indicating means mounted at one end thereof, thermal-responsive means surrounding the shaft intermediate its ends and adapted to exert opposing actions thereon, and means mounted at the other end of the shaft to compensate for the unequal heat dissipation from the thermal-responsive means caused by the indicating means.

7. An electrical measuring instrument comprising a rotatable shaft, indicating means mounted at one end thereof, two thermal-responsive means attached to the shaft intermediate its ends and adapted to exert opposing actions thereon, and means associated with the other end of the shaft to compensate for the unequal heat dissipation from the two thermal-responsive devices.

8. An electrical measuring instrument comprising a rotatable shaft, indicating means mounted at one end thereof, two thermal-responsive means attached to the shaft intermediate its ends and adapted to exert opposing actions thereon, and heat-conducting means mounted at the other end of the shaft to equalize the heat dissipation of the two thermal-responsive means.

9. An electrical instrument comprising an indicating member, two thermal-responsive spring members attached to the indicating member, and adapted to exert opposing actions thereon, and means for equalizing the heat dissipation from the two thermal-responsive members.

10. A slowly-responding wattmeter comprising a rotatable shaft, an indicator mounted thereon, two bimetallic springs surrounding the shaft and adapted to exert opposing actions thereon, and a winding at each side of each spring for heating the same in accordance with the sum and the difference of the current and voltage of the circuit to be measured.

In testimony whereof, we have hereunto subscribed our names this 29th day of March, 1917.

PAUL M. LINCOLN.
BENJAMIN H. SMITH.